Oct. 18, 1932.  J. H. FORD  1,883,739
ROOF FOR VEHICLES
Filed March 28, 1930   2 Sheets-Sheet 1
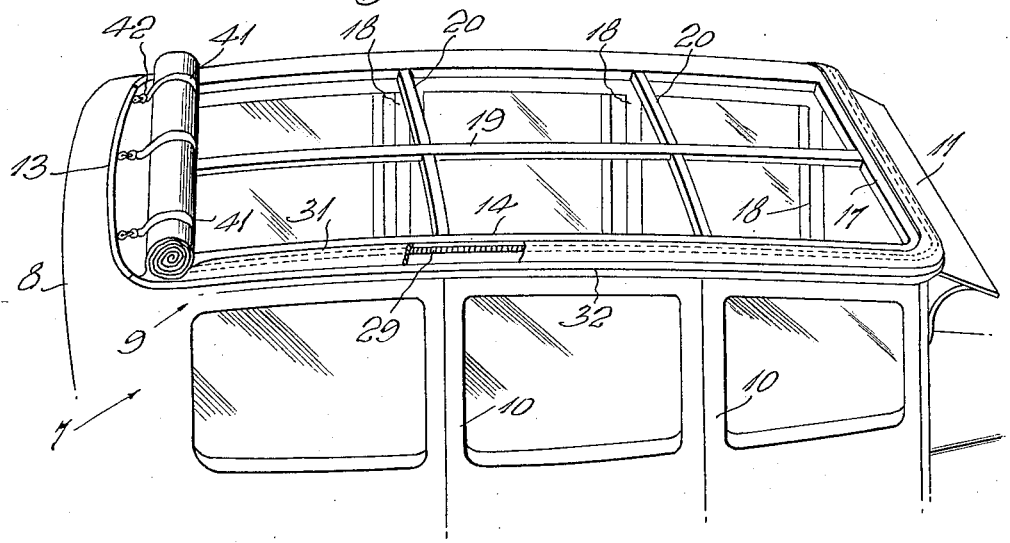
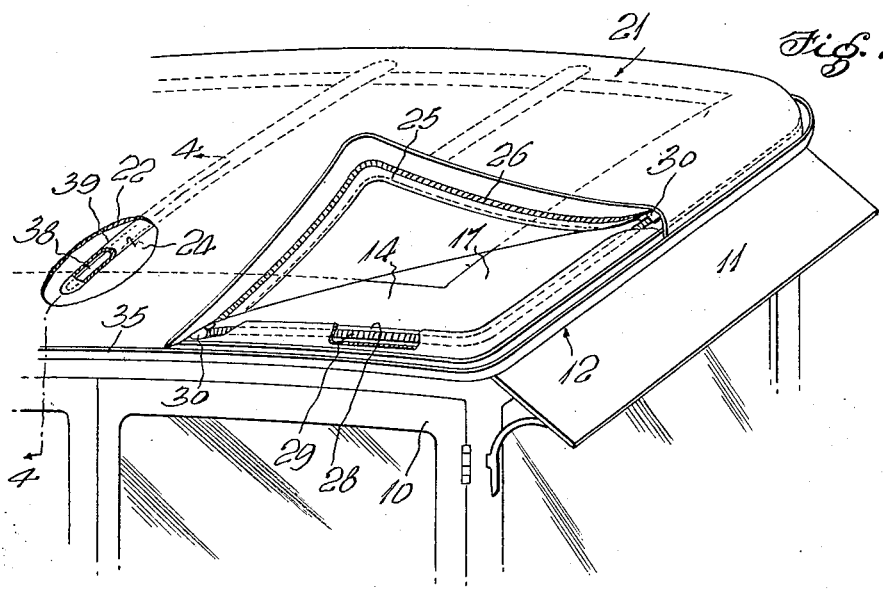
J. H. Ford
Inventor
By Elmer Stewart
Attorney Oct. 18, 1932. J. H. FORD 1,883,739
ROOF FOR VEHICLES
Filed March 28, 1930 2 Sheets-Sheet 2
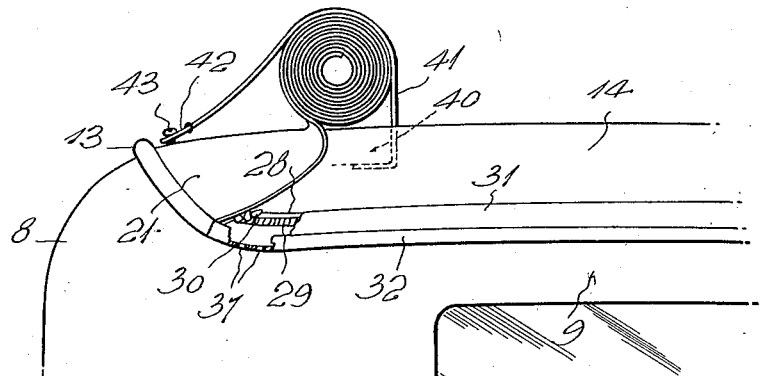
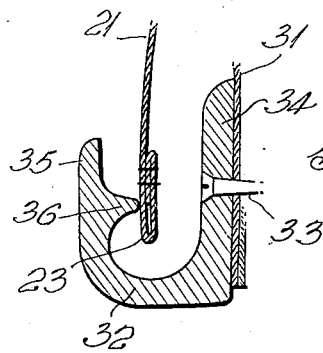
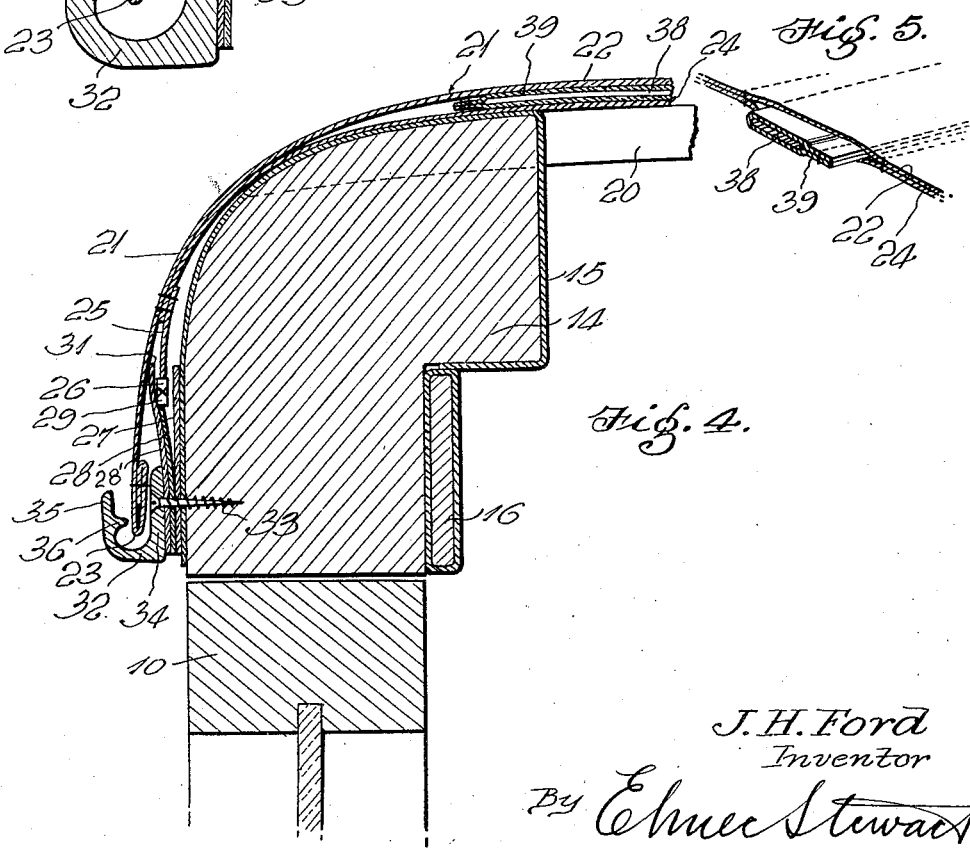
J. H. Ford
Inventor
By Ernee Stewart
Attorney Patented Oct. 18, 1932

1,883,739

UNITED STATES PATENT OFFICE

JOHN H. FORD, OF WASHINGTON, DISTRICT OF COLUMBIA

ROOF FOR VEHICLES

Application filed March 28, 1930. Serial No. 439,808.

This invention relates to certain improvements in vehicle bodies and more particularly in the arrangement of the roofs or tops of automobiles. In the mass production of automobiles it has been found necessary to restrict the design to that form of vehicle which most nearly meets the demands of the majority of users. Variation in design from the standard thus imposed by the buyers' demands results in greatly increased cost. It follows that any attempt of the manufacturer to provide a variety of styles is limited by the increased cost due to the fact that such varied styles cannot be produced in the large numbers necessary to obtain lower costs comparable with the standard or conventional design. For example the present tendency has been toward the adoption of a permanent top for passenger vehicles and as a result of production in large quantities, the cost of such vehicles has been reduced materially. There remains, however, a large demand where the personal preference of the buyer or the climatic conditions of his locality increase the desirability for a top which may be open in contrast to one which is fixed.

This is particularly true where the occupants of the car desire to look upwardly at high buildings, mountain scenery, objects in the sky or the like. Again, the locality may be such that shelter from the elements or sun is not necessary. In such instances the provision of a permanent top is a distinct disadvantage and yet will not justify the increased cost of an open top or the inconvenience of operating the latter. In particular the use of cars for sight seeing or riding for pleasure is enhanced when the vehicles may be altered to take advantage of good weather and permit unrestricted upward vision.

An object of this invention is to provide for the ready modification of the conventional or standardized fixed tops of automobiles to permit their conversion into vehicles having open tops. In accomplishing this it has been borne in mind that such modification is to be carried out with the minimum of expense.

It is a further object of this invention to provide a removable roof which will retain all of the advantages found in a fixed top and will resemble the latter in all outward appearances.

It is also an object of this invention to provide a roof which is fastened to the top of the automobile with uniform stretching at all points and proof against leaking.

The above and other advantages of my invention will be evident from the following description of the preferred form as illustrated in the accompanying drawings in which:

Fig. 1 is a perspective view of an automobile top with the roof rolled back;

Fig. 2 is a perspective view of the top with the roof in place;

Fig. 3 is a side elevation of the rear quarter of the top;

Fig. 4 is a transverse vertical section on the line 4—4 of Fig. 2;

Fig. 5 is a detailed perspective view of the reenforcing means and;

Fig. 6 is an enlarged transverse vertical section of the molding and the edge of the roof.

As an example of one way in which my invention may be applied I have shown an automobile 7 of the type commonly known as a closed vehicle having back 8, side 9, doors 10, and vizor 11. A metal molding 12 occupies the usual position around the upper edge of the body of the automobile from one quarter around the front and terminating over the opposite quarter. The ends of the drip molding have been carried up to meet the ends of a connecting molding 13 which runs transversely over the top of the back. The side rails 14 form parts of the permanent body of the car and are the same in form as those used in the manufacture of cars having the permanently closed top. As shown in Fig. 4 the side rails 14 are covered with a textile or other flexible covering or surface layer 15 to give the rails a pleasing appearance and conform to the decoration of the interior of the vehicle. A similarly covered strip 16 is applied to the vertical inner wall of the rail 14 as illustrated in Fig. 4. The same treatment is applied to the front rail 17 which extends between the side rails and back of the windshield.

The side rails 14 rest upon side posts 18, 18 which appear behind the side edges of the doors.

A center bar 19 preferably of steel for greater rigidity and minimum bulk is seated in the front rail 17 and extends with a slight upward curvature or bow back to the center of the frame forming part of the back 8. Transverse bows 20, 20 are arched across and under the bar 19 being seated with their ends in the side rails 14, 14 as shown in dotted lines in Fig. 4. The bars 20 are cut away to a slight extent to receive the bar 19 so that the upper surface of the latter will be coincident with the top of the bars 20.

By forming the frame work for the roof as indicated with the side rails 14, the center bar 19, and the transverse bows 20, the general features and advantages of a rigid body is retained.

In order to provide a roof or top which shall have every appearance of being a permanent fixture and yet which may be quickly rolled out of the line of vision, I have provided a flexible cover 21. This cover has an outer layer 22 of weatherproof fabric, leather or artificial composition. It is generally seamless and is permanently attached to the back 8 and beneath the rear beading or molding 13. The free edges of the layer 22 are stitched to form a hem or fold as shown in Fig. 4.

An interior layer 24 of the cover is shown as terminating short of the edges 23 and being stitched both to the top layer 22 and to a strip 25. This strip 25 has a series of fastener elements 26 on its free edge. This strip 25 extends from the quarter of the car forward to the center of the front edge where it meets a similar strip from the other side edge.

The outer side wall of the side rail 14 carries a smooth strip 27 made of ductile metal or the like providing considerable freedom from friction. This forms a bearing strip to allow ready operation of the fastener for the top and extends above the meeting line of the fastener as shown in Fig. 4.

Outwardly of the strip 27 the side and front rails carry a strip 28 having a complementary series of fastener elements 29. A slider 30 is mounted on the fastener elements 26, 29 and serves to attach or detach them dependent upon the direction in which it is moved.

A cover strip 28′ of fabric, rubber, composition or the like is provided to cover the lower strip 28 and the fastener elements 26, 29. This serves to conceal the fastening and to protect it.

A molding 32 preferably made of ductile metal or similar compositions is attached by means of wood screws 33 to the outer surface of the rails 14 and 17 and serves to bind the strips 27, 28 and 31 in place. As indicated in Fig. 6 the molding 32 has a base 34 adapted to lie flat against the flap 31. The free edge 35 of the molding extends vertically in spaced parallel relation to the base 34. The inner surface of the free edge 35 carries a rib 36 which projects inwardly toward the base 34. This rib is preferably discontinuous. In this way a generally circular channel is provided between the parts 35 and the base 34. This channel serves to receive any drip from the top of the vehicle and to deliver it at the corners through drain openings 37 as shown in Fig. 3. The drain channel of the molding also serves the purpose of confining the free edge 23 of the cover layer 21 and in order to insure that the drip from the cover shall be received by the drip molding without risk of splitting over the side of the molding, the edge 23 abuts against the rib 36.

The cover 21 is reinforced between its upper layer 22 and the lower layer 24 by means of a series of spaced transverse metal ribs 38. These ribs are formed of flat rigid strips of resilient metal and of sufficient length to overlie the inner edge of the side rails 14, 14 as indicated in Fig. 4. These ribs 38 are held in place by means of fabric sleeves 39 which in turn are sewed or otherwise attached to either top layer 22 or lower layer 24 or to both of them. The back 8 extends forwardly of the bead molding 13 to provide a rear deck 40 upon which the cover may be supported in a relatively tight roll.

In rolling the cover from the front to the rear the transverse reinforcing ribs 38 serve to maintain the roll in the desired axial direction and to keep the final roll in the proper shape. As shown in Fig. 3 the roll is held in place by means of strips 41 which are detachably fastened beneath the upper deck 40 and have their free ends terminating in eyelets or loops 42 which are held by studs 43 slightly in advance of the molding 13.

The roller cover when placed upon the rear deck 40 occupies but little space and offers slight resistance to the wind. In this position the fasteners 26 are concealed from view while the complementary fasteners 29 are protected by the flap 31 as shown in Fig. 1. When it is desired to close the top the straps 41 are released and the cover drawn forward over the frame-work. The sliders 30 are caused to slide forward along the fastener elements 29 and 26 until the sliders meet in the center of the front. In this operation the cover 21 is drawn down tight over the framework and the reinforcing ribs 38 are put under flexure. The form of fastener is such that the cover is drawn tight at every point on the side and front so that the surface becomes smooth and firm. The edge 23 of the cover is free from the tension of the interlocked fastener and is then inserted within the drip molding back of the rib 36. The appearance is, therefore, exactly the same as when the cover is firmly and permanently attached back of the ordinary drip molding.

From the above it will be seen that a cover is provided which gives every appearance of being a permanent cover for the conventional closed vehicle. In this aspect it is a full protection for the top and co-operates with the ordinary drip molding.

When it is desired to increase the visibility or exposure by removing the cover it requires merely the movement of the sliders from the front to the quarters and the rolling back of the cover. The cover is then readily fastened in rolled position and due to the form of the flap 31 the side rails 14 are given a smooth appearance completely concealing the lower part 29 of the fastener. In the operation of the fastener it is found that the wear plate 27 contributes largely to the ease with which the fastener is operated particularly around the corners.

In the above description of the preferred form of the invention it will be apparent that considerable latitude in the selection of materials and proportions is possible within the scope of the following claims.

What I claim is:

1. In a vehicle having an open top, frame members across the top, a flexible covering attached to one end of said top, fastener elements carried inwardly of and parallel to the free edges of the covering, cooperating fastener elements mounted on the top in uniform interlocking relation with said first named fastener elements throughout the sides and front of the top, means for interlocking said fastener elements and a channeled molding around the sides and front of said top receiving and concealing the said edges of the covering free from the tension of the said interlocked fastener elements.

2. In a vehicle having an open top, frame members across the top, a flexible covering attached to one end of said top, interlocking means inwardly of the free edges of the flexible covering and fastening the latter continuously around the sides and front of the top, a channeled molding around the sides and front of the top and separate means within the channel of said molding to position the free edge of the covering in spaced relation to the side of the molding.

3. In a vehicle having an open top, frame members across the top, a flexible covering attached to one end of said top, interlocking means fastening the flexible covering around the sides and front of the top, a channeled molding around the sides and front of the top, and means within said molding cooperating with the free edge of the covering to form a second channel.

4. In a vehicle having an open top, frame members across the top, a flexible covering attached to one end of said top, a strip having fastener elements carried on the underside of said covering around its free edges, a wear plate around the edge of the top, a strip having complementary fastener elements, a flap, a channeled molding and means for attaching the wear plate, last named strip, flap and molding in superposed positions and means for interlocking the fastener elements of the two strips with the edges of the flexible covering within the channel of the molding.

In testimony whereof, I affix my signature.

JOHN H. FORD.